United States Patent [19]
Best et al.

[11] 4,162,088
[45] Jul. 24, 1979

[54] POWERED SNOW SKI

[76] Inventors: Gordon K. Best, 1809 "H" St. SE. #10, Auburn, Wash. 98002; Dennis O. Best, P.O. Box 14, Springdale, Wash. 99173

[21] Appl. No.: 887,998

[22] Filed: Mar. 20, 1978

[51] Int. Cl.² .......................................... B62M 27/02
[52] U.S. Cl. .................................... 280/606; 180/190
[58] Field of Search ......... 280/606, 16, 21 R, 12 AA; 180/5 R

[56] References Cited

U.S. PATENT DOCUMENTS

| | | | |
|---|---|---|---|
| 1,851,963 | 4/1932 | Anderson | 280/606 |
| 3,290,048 | 12/1966 | Tokuda | 280/606 |
| 3,794,131 | 2/1974 | Freedman et al. | 180/5 R |

Primary Examiner—Richard A. Bertsch

[57] ABSTRACT

A powered ski with forward steering mechanism having a depending rudder controlled by an upstanding handle bar that aids to support of a rider upon the device. The rearward portion of the ski carries a motor mechanically linked to the drive roll of a belt drive depending through an opening in the rearward portion of the ski to contact an underlying supportive snow surface for locomotion. An optical seating frame is provided to fit about the motor and drive mechanism.

4 Claims, 11 Drawing Figures

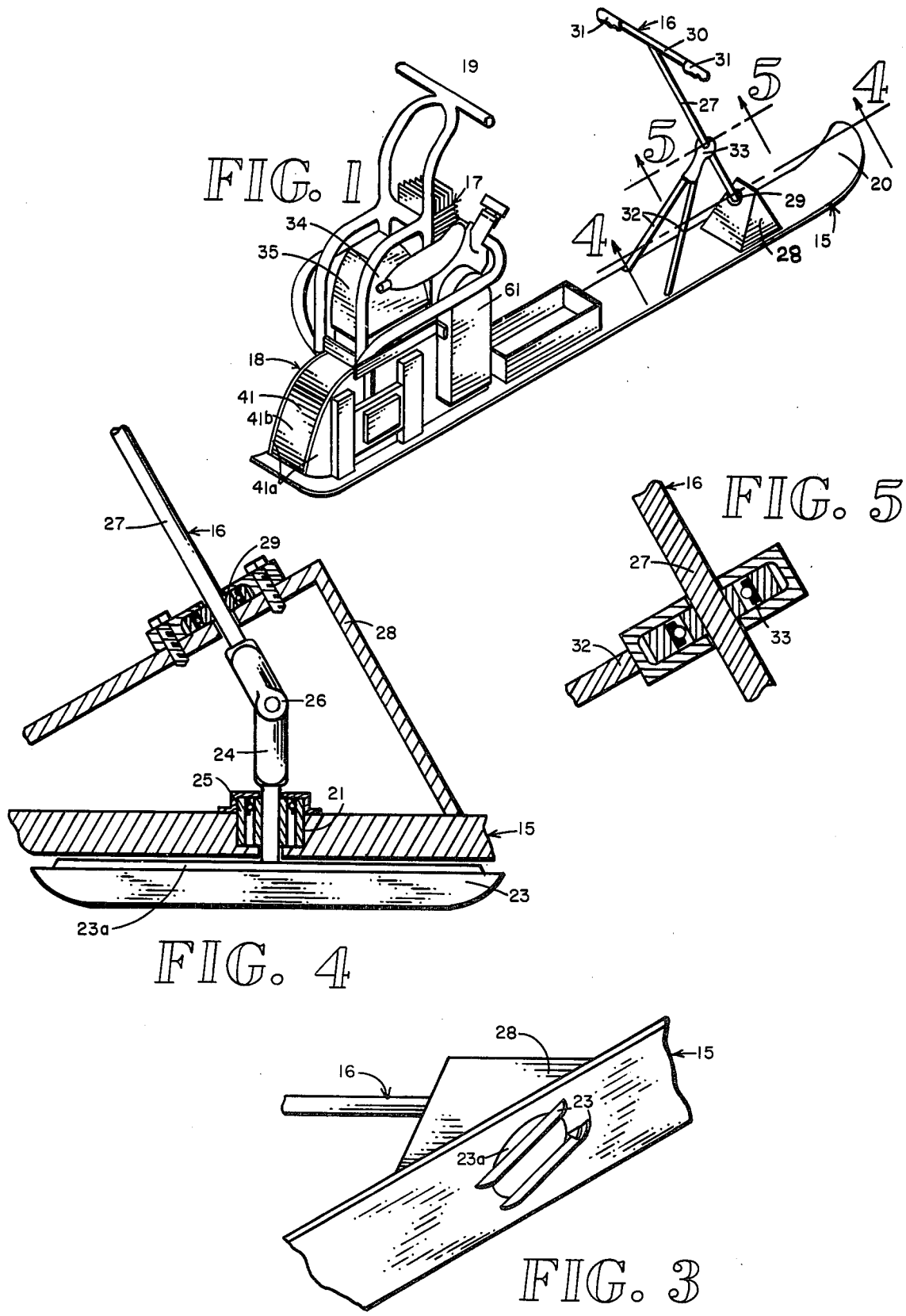

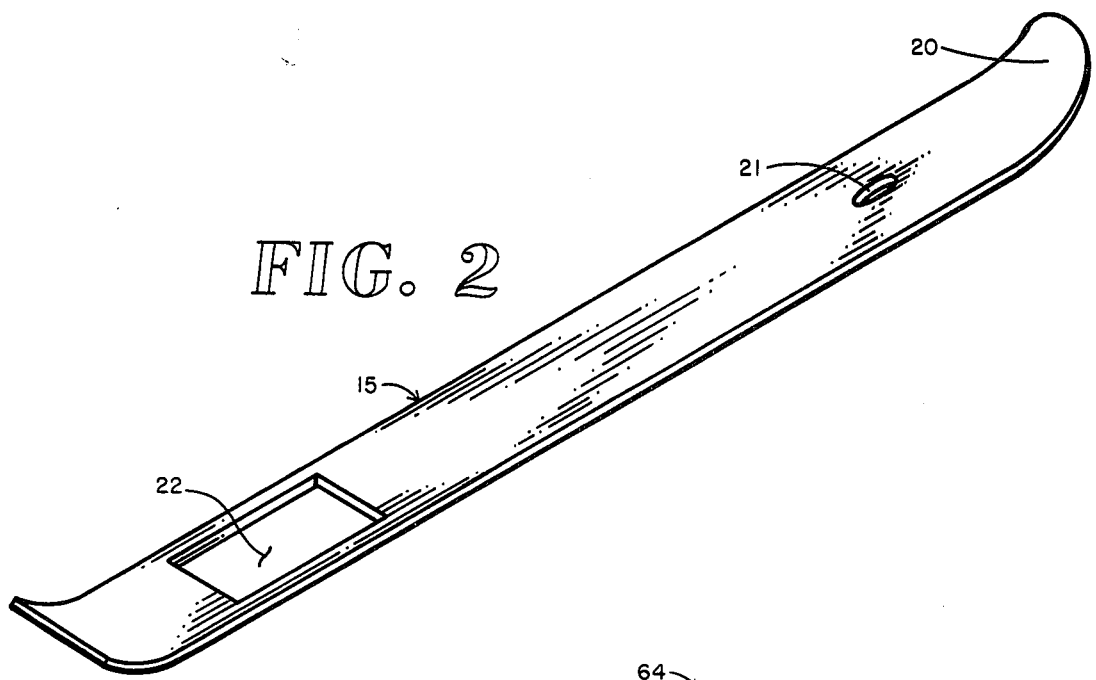
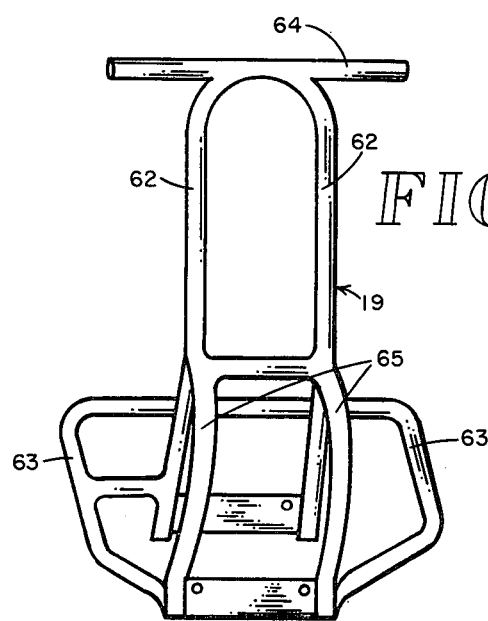
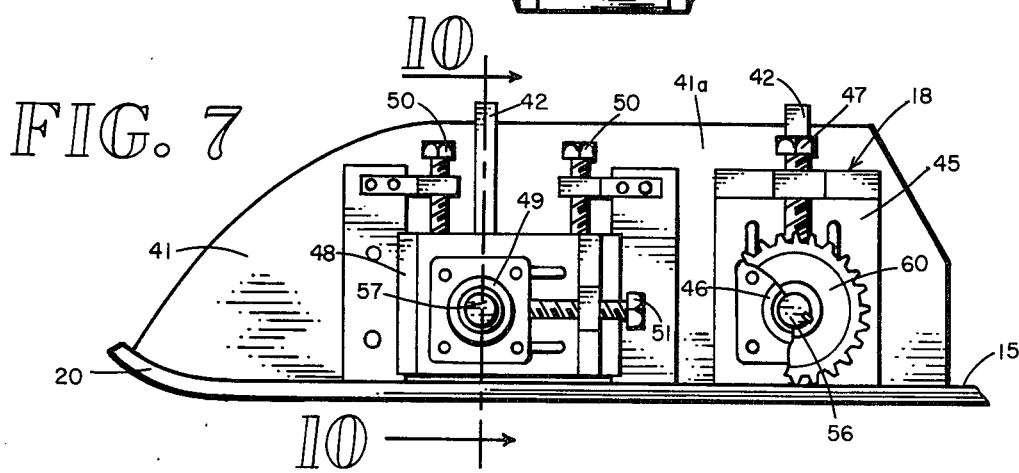

POWERED SNOW SKI

BACKGROUND OF INVENTION

A. Related Applications

There are no applications related hereto now filed in this or any foreign country.

B. Field of Invention

Our invention relates generally to motor vehicles and more particularly to a motor powered ski driven by a traction belt.

C. Description of Prior Art

Various vehicles for snow travel have heretofore been mechanized. The broad spectrum of such vehicles may be divided by size, generally into a first class of large vehicles such as the snow cat designed principally for the transport of large loads, a second class of middle sized vehicles such as the snowmobile that are designed for substantial loads but are yet generally smaller than the first class of vehicles, and a third class of mechanized skis comprising the smallest of such vehicles. Each of these classes is readily distinguishable from the other because of structural features essentially related to the size and type of use of the vehicle and the load carried. Our invention is concerned with a new device of the third class.

The mechanized ski-type vehicles heretofore known provide in common a ski body having a steering means and motor associated with some driving means, generally either a friction wheel or belt. In all such vehicles, these elements, per se, are common and each particular vehicle differs from the other only in its special combination of accidental features. The instant invention differs from the prior art by providing in the forward part of the ski body a rudder mechanism controlled by an upwardly extending steering bar that in addition to steering may be used by an operator to aid in maintaining support upon the vehicle in a fashion similar to the ordinary child's scooter. A cog belt type driving mechanism depends through an orifice in the rearward portion of the ski body and is mounted thereon in a movable fashion so that it might be moved upwardly and downwardly responsively to the terrain being traversed and the power required to be transmitted thereby. The steering rudder is positioned in the forwardmost portion of our ski at a substantial distance from the driving mechanism to provide relatively easy steering and accurate directional regulation that yet tend to maintain an established course of travel. An auxiliary frame may be attached to the device over and about the motor and driving mechanism to allow a user to be seated upon the vehicle to increase his comfort, to provide protection to the operative mechanism and to aid in providing operational stability. The specific mechanical structures necessary to accomplish each of these functions as hereinafter more particularly described distinguish our invention from the prior art individually and in combination with each other, all to provide a new and novel member of the group of snow skis.

SUMMARY OF INVENTION

Our invention generally provides a powered snow ski of relatively small size and mass with its snow contacting ski portion being substantially the size of a traditional unpowered snow ski.

We provide a ski body of traditional configuration and appropriate bearing surface to support the loads to be carried by it upon the snow surface it is to traverse. The forward medial portion of the ski body journals a depending steering rudder movable for steerage by an upwardly extending steering rod and associated handle positioned in the forward portion of the device to also aid an operator in maintaining position upon the ski. The medial part of the ski body provides an area for support of an operator, and especially his feet, whether his position be one of standing, squatting or sitting. The rearward portion of the ski body supports a prime mover mechanically linked to a cog-type drive belt that is mounted for vertical positioning over an orifice rearward medial part of the ski body. The drive belt is mechanically biased to a lower position to depend below the lower surface of the ski body to propell it by moving upon the underlying snow surface.

A seating frame is optionally provided to fit about the rearward powering mechanism and drive belt to support an operator in a seated position and to protect the operating mechanism from accidental damage.

In creating such a device it is:

A principal object of our invention to provide a powered snow ski that has a forward steering rudder at substantial distance from the rearward driving wheel to allow easy and stable steerage and course maintenance.

A further object of our invention to provide a powered ski with such a steering system that has a steering rod and handle bar upstanding in the forward part of the ski to aid in providing operator support on the ski.

A further object of our invention to provide a depending drive belt that is mounted on the ski body to allow vertical adjustment to provide efficient power variance and usage by the vehicle under different operating conditions.

A still further object of our invention to provide such a device that is of new and novel design, of rugged and durable nature, of simple and economic manufacture and otherwise well suited to the uses and purposes for which it is intended.

Other and further objects of our invention will appear from the following specification and accompanying drawings which form a part hereof. In carrying out the objects of the invention, however, it is to be understood that its essential features are susceptible to change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of our invention showing its various parts, their configuration and relationship.

FIG. 2 is an isometric view looking downwardly upon the ski body of our invention.

FIG. 3 is a partial cut-away, isometric view looking upwardly at the bottom of the depending rudder mechanism of our invention.

FIG. 4 is a somewhat enlarged, partially cut-away, orthographic, cross-sectional view through a part of the steering mechanism taken on a line 4—4 of FIG. 1 in the direction indicated by the arrows on that line.

FIG. 5 is a cross-sectional view through the upper support bearing of the steering shaft of our invention on a line similar to that of FIG. 4.

FIG. 6 is an isometric view of seating frame of our invention isolated from its supporting motor mount.

FIG. 7 is an orthographic side view of the drive belt mounting mechanism supported on the rearward part of our ski body.

DESCRIPTION OF THE PREFERRED EMBODIMENT

Figure 8:
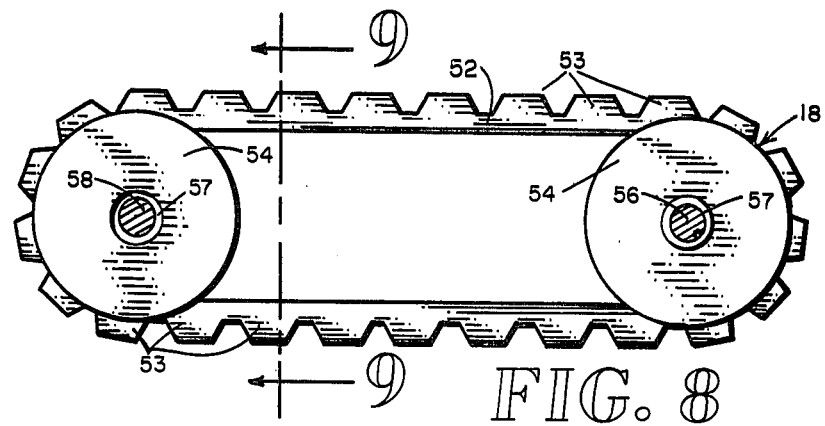
FIG. 8 is an orthographic cross-sectional view of the drive belt of our invention carried on its supporting rollers.

Our invention generally provides ski body 15 mounting steering mechanism 16 in its forward medial portion and carrying powering mechanism 17 in its medial rearward portion to communicate by appropriate mechanical linkage with belt type driving mechanism 18. An optional protective seating frame 19 may be provided over and about the powering and driving mechanisms.

Ski body 15 is of the traditional flat elongate shape of the unpowered ski with upturned forwardmost portion 20. The forward medial part of the ski body defines steering shaft hole 21 and the rearward medial part defines drive belt slot 22 to allow communication of the drive belt therethrough and with the underlying supportative surface. The shape of the drive belt slot is not critical so long as its purpose is fulfilled; it may define an enclosed hole, as illustrated in FIG. 8, or it may extend completely to the rearward end of the ski to form an open-ended slot. Normally the former construction is preferred because it provides greater structural strength and physical rigidity in the ski. The ski body must be of an appropriate size, or more properly have a sufficient horizontal area, to support the loads that it is to carry on the surface that supports it, but this requirement in general is fulfilled by a member of substantially the size and configuration of a normal snow ski of the unpowered type heretofore known. If the design is to be used on very light or powdery snow surfaces it may be desirable to increase its supportative surface area and if this be done, it is best done by increasing the width of the ski body as an increase in length will change steering properties and oftentimes make the ski unwieldy, especially on uneven and undulating surfaces or in debris strewn areas. For normal size operators under normally existing conditions a ski body of the shape illustrated, approximately 9½ inches or more wide and 7½ to 8 feet long is desirable.

The ski body may be formed of any of the traditional known methods of the ski manufacturing arts from the traditional elastically rigid materials. I preferably form the ski body from glass reinforced plastics to give it a high degree of maintenance free durability and appropriate resilient strength.

Steering mechanism 16 is illustrated in FIG. 1 and FIG. 3 where it is seen to comprise spaced, parallel, relatively thin, sheet-like steering rudders 23 having appreciable area in a vertical plane structurally carried by and depending from relatively flat rudder plate 23a. The rudder plate is irrotatably carried, immediately below the ski body by rudder control arm 24, journaled in rudder control arm bearing 25 supported in steering shaft hole 21 defined in the ski body. The upper portion of the rudder control arm structurally communicates with universal joint 26 which in turn operatively communicates with elongate upwardly extending rod-like steering column 27. Steering column housing 28 carried by the upper surface of ski body 15 extends upwardly from the ski body to cover universal joint 26 and provide in its upper surface structural support for steering column bearing 29 which journals the lower portion of the steering column, as illustrated in FIG. 4. The steering column is of a length sufficient to extend upwardly and at a slightly rearward angle, as illustrated, to a height approximately at the waist of the prospective user, normally some 36 odd inches vertically above the upper surfaces of the ski body. The uppermost portion of the steering column structurally carries in an irrotatable fashion perpendicularly extending steering handle bar 30 having similar opposed grips 31 of traditional design in its end parts to aid the gripping and use thereof.

Preferably to provide additional structural rigidity, a rubular steering column support 32 extends upwardly and at a forward angle to rotatably communicate by bearing 33 with steering column 27 at a position below the steering column and above the steering column housing. This particular type of support is not essential to my invention but generally some auxiliary support for the steering column is desirable because of its otherwise cantilever type of support.

With this articulated steering structure then, as handle bars 30 are manually moved to pivot steering column 27, the rotary motion will be transmitted through universal joint 26 to similarly pivot steering rudders 23 and thereby direct the future course of the forward part of the ski body relative the rearward driving mechanism to allow steerage as the ski moves over a supporting snow surface. It should be noted that there is a substantial distance between the steering rudder and the propelling mechanism to create a substantial steering leverage to make the steering responsive and accurate. It should also be noted that the steering rudder has a substantial cross-sectional area in a vertical plane to prevent or at least substantially alleviate slippage during steerage.

The steering mechanism parts are formed from some rigid, structurally durable material, preferably a metal such as mild steel. The structural connection to parts may be accomplished by normal mechanical fastening means. Preferably the journaling of the various parts of the steering mechanism is of the ball bearing type to provide more durability and rigidity to the structure.

Powering mechanism 17 comprises prime mover or motor 34, commonly a gasoline fueled internal combustion engine, mounted on the upper surface of driving mechanism housing 41 which in turn is carried by the ski body to extend vertically above drive belt slot 22 defined therein. For convenience the motor preferably should be of lightweight and should have a configuration that does not result in too much lateral extension beyond that of the driving mechanism housing. The motor preferably is protected by appropriately configured shroud or covering 35 structurally carried by the motor and the upper surface of the driving mechanism housing. The motor is not a critical element, per se, of our invention and most lightweight motors commonly used for propulsion of small vehicles and capable of power output in the five horsepower range will be operative.

Motor 34 provides horizontal, laterally extending driven shaft 36 which communicates through over-ride type clutch 37 to driving sprocket shaft 38 extending laterally outward from and beyond motor covering 35 to there irrotatably mount driving sprocket 39 operatively carrying roller link driving chain 40.

Driving mechanism 18 is carried within peripheral driving mechanism housing 41, configured to cover the driving belt and define an internal chamber within which it may operate. The driving belt housing is structurally carried by the upper surface of ski body 15 and comprises similar spaced side elements 41a interconnected by top 41b and carrying paired opposed motor mountes 42. Opposed cooperating belt driving shaft holes are provided in the forward medial part of the driving mechanism housing and belt idler shaft holes are defined in the rearward medial part of those members, all of appropriate configuration to allow adjustment motion of the belt shaft. Paired opposed vertically adjustable driving shaft bearing mountings 45 are positioned on each of the lateral surfaces of driving housing sides 41a about the driving shaft holes and each housing carries driving shaft bearing 46 vertically adjustable in mountings 45 by manipulation of adjustment screws 47. Idler shaft bearing mountings 48 are carried by the sides of driving mechanism housing about the idler shaft holes. Each of these mountings carries one of the opposed cooperating idler shaft bearings 49 that is adjustable vertically by means of adjustment screws 50 and adjustable horizontally to maintain belt tension by means of tension adjustment screw 51. These adjustable bearing mountings are of a type well known in mechanical arts and readily available as a standard item of commerce. Bearings 46, 49 are preferably of a commercial ball or roller type to provide greater durability.

Figure 9:
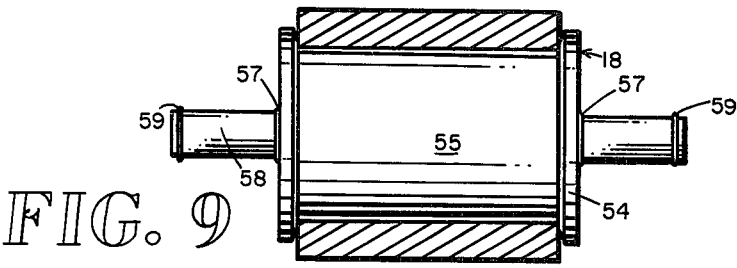
FIG. 9 is a cross-sectional view of the drive belt of FIG. 8 taken through one of the belt carrying rollers on the line 9—9 of FIG. 8 in the direction indicated by the arrows thereon.
Figure 10:
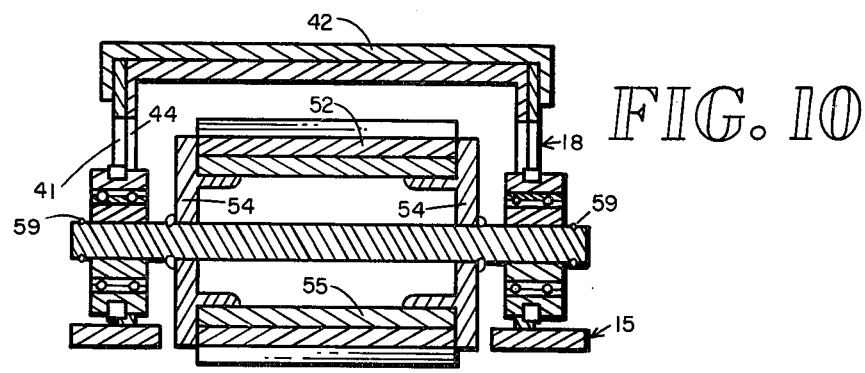
FIG. 10 is a cross-sectional view through the belt drive mounting of FIG. 7 taken on the line 10—10 thereon in the direction indicated by the arrows.
Figure 11:
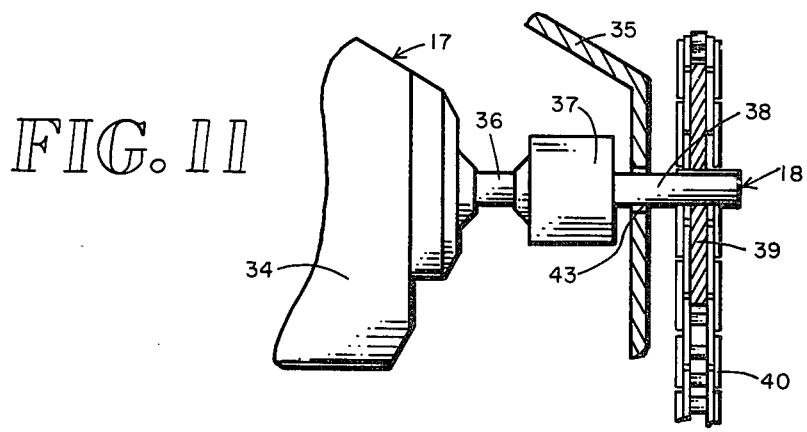
FIG. 11 is a somewhat enlarged, partially cut-away, cross-sectional view showing the drive train between the driving motor and motor cog that drives the belt cog.

The driving mechanism itself is shown bestly in the drawings of FIG. 8, FIG. 9 and FIG. 10, where it is seen to include elongate endless belt 52 with smooth inner surface and outer traction surface formed by plural spaced transverse cogs 53. The belt is supported on similar opposed cooperating belt rollers, each comprising spaced hubs 54 structurally joined by somewhat diametrically smaller roller body 55. Forward roll is maintained in medial position on driving shaft 56 by "0" rings 57 and the rearward roll is maintained on idler shaft 58 by similar "0" rings 57. Driving shaft 56 is maintained in lateral alignment between driving shaft bearings 46 by snap rings 59 and the idler shaft is similarly maintained in lateral alignment between idler shaft bearings 49 by similar snap rings 59. One end of driving shaft 56 projects some distance laterally beyond its journaling bearing 46 to irrotatably mount driven cog 60 in a lateral position to cooperate with motor driving sprocket 39 to operatively receive driving chain 40 therebetween for safety sake thus driving chain is preferably covered by driving chain housing 61 structurally carried by the motor cover and driving mechanism housing.

Preferably the driving belt 52 is formed of some flexible material so that it may readily traverse the course required of it. Fibre reinforced rubber or plastic polymer is a suitable material for this purpose. The outer belt contacting surfaces of belt roller body 55 are also preferably formed of some material that has a substantial coefficient of friction when in contact with the inner surface of belt 52 to provide efficient power transmission between roll and belt and prevent slipage. Again, rubber is an ideal material for this purpose. The exact configuration and dimensioning of the belt and its rollers is not essential to my invention but with an average ski as before specified I find a belt having a width of about 4 inches and a circumferential length of about 18 inches is well suited for use in our vehicle.

With the driving mechanism illustrated it is to be noted that the depth of extension or dependency of the lower surface of belt 52 below the lower surface of the ski body may be adjusted within limits to accommodate various operating conditions. Normally it is preferable that this adjustment be discrete and predetermined by an operator though obviously, if desired, the belt might be movably mounted for free motion in at least a vertical direction and mechanically biased to a lowermost position so that it might move to intermediate position responsive to existing operating conditions. Normally with the type of belt drive illustrated, however, it is more conveniently operative if such adjustment be discretely fixed.

A seating frame 19, illustrated especially in FIG. 9 and FIG. 10 may be associated with our invention. As is seen in FIG. 9, the seating frame comprises three dimensional tubular structure with upwardly extending, paired opposed back supports 62 carrying in their lowermost part substantially perpendicularly extending peripheral bumper 63, and in their uppermost part handle element 64. "L" shaped seat element 65 extends from structural communication with the medial part of the back support forwardly and downwardly to the forward medial part of the peripheral guard element, with a substantially horizontal surface near the back support to provide a seat for an operator. The seating frame is designed and configured substantially as illustrated so that the seat portion will be vertically above the powering and driving mechanism and the peripheral guard element will fit about those structures all to provide some protection for them and yet provide a seat for an operator.

The seating frame is preferably formed from some rigid structurally durable material, such as tubular metal as in the case illustrated, and joined by appropriate mechanical means, as in this instance by welding. The structure is releasably fastened to the motor mounts of the driving mechanism housing so that the frame may be removed if desired.

Having thusly described my invention, its operation may be readily understood.

Firstly, a device is formed substantially as specified. A user positions himself on our ski normally in a standing position. The motor is started and power generated thereby transmitted to driving mechanism 18 which ultimately moves driving belt 52 in frictional engagement with the underlying supportative surface to cause reactive motion of our ski thereover. The speed of this motion may be regulated in the traditional fashion by regulation of the speed of the motor, preferably by means of a hand operated throttle carried on steering handle bar 30. During motion of the device the operator must maintain stability in somewhat the same fashion as would be done with a traditional ski or a scooter. During motion steerage is accomplished by turning the steering bar which in turn correspondingly moves the rudders to cause motion of the ski in the same direction as the handle bar is turned and in proportion to that rotation. No particular skill is required to operate the device and it may be quite readily operated by inexperienced persons, though the sophistication of operation may be enhanced by operator experience.

The foregoing description of my invention is necessarily of a detailed nature so that a specific embodiment of it might be set forth as required, but it is to be understood that various modifications in detail, rearrangement and multiplication of parts might be resorted to without departing from its spirit, essence or scope.

Having thusly described our invention, what we desire to protect by Letters Patent, and what we claim is:

1. A powered snow ski, comprising, in combination:
   an elongate unitary ski body defining a steering hole in the forward medial part and a driving belt slot in the rearward medial part;
   steering mechanism comprising a least one relatively thin steering rudder having a substantial areal surface in a vertical plane, depending below the ski body from a rudder control arm journaled in a bearing carried in the steering hole in the ski body, with a steering column extending upwardly from joinder with the rudder control arm to provide means for rotary manipulation of said rudder by a user;
   a driving mechanism supported on the ski body having an endless driving belt with a portion of the periphery of the driving belt depending through the driving belt slot and below the lowermost surface of the ski body for frictional engagement with an underlying supportative snow surface; and
   a prime mover carried in the rearward portion of the ski body adjacent the driving mechanism and operatively communicating with the driving mechanism.

2. A powered snow ski comprising, in combination:
   an elongate ski body defining a steering shaft hole in the forward medial part and a drive belt slot in the rearward medial part;
   a steering mechanism having two thin, spaced, parallel rudders with substantial areal surface in a vertical plane depending from a thin rudder plate having its principal areal surface in a horizontal plane substantially parrallel to the ski body and perpendicular to the rudders, the rudder plate being irrotatably carried immediately below the ski body by a rudder control arm journaled in the steering shaft hole, with an elongate steering column irrotatably communicating with the rudder control arm by a universal joint and extending upwardly and rearwardly therefrom to support a handle bar at its upper end above the medial part of the ski body;
   a driving mechanism housing, carried by the ski body to define a chamber above the drive belt slot, journaling paired opposed drive belt rollers in the forward and rearward parts of the chamber, said drive belt rollers carrying therebetween an endless drive belt with a portion of its peripheral surface depending through the driving belt slot and below the ski body to operatively communicate with an underlying supportative surface;
   a motor carried by the upper part of the driving mechansim housing; and
   mechanical linkage operatively interconnecting the motor with at least one belt roll of the endless drive belt to transmit motion of the motor to the drive belt to cause locomotion of the ski body over an underlying supportative surface.

3. The invention of claim 2 further characterized by:
   adjustable mounting of the bearings journaling the drive belt rollers in the driving mechanism housing to allow adjustable vertical positioning of those rollers relative to the driving belt housing and the ski body and to allow tightening of the drive belt between the rollers.

4. The invention of claim 2 further characterized by:
   a tubular steering frame in the rearward portion of the ski body extending over and about the motor and driving mechanism housing to define a seat above the driving mechanism housing to support an operator in a seated position on the ski and to protect the motor and driving mechanism.

* * * * *